United States Patent [19]

Sayward, Jr.

[11] Patent Number: 4,658,117
[45] Date of Patent: Apr. 14, 1987

[54] FOOD WARMER WITH REMOVABLE ELECTRIC HEATER

[75] Inventor: Samuel S. Sayward, Jr., Danvers, Mass.

[73] Assignee: Oneida, Ltd., Oneida, N.Y.

[21] Appl. No.: 821,957

[22] Filed: Jan. 24, 1986

[51] Int. Cl.⁴ .................... H05B 3/82; A47J 27/18
[52] U.S. Cl. ................................. 219/437; 126/33;
   219/315; 219/318; 219/336; 219/415; 219/523;
   219/534; 219/536
[58] Field of Search ............. 219/310, 312, 316, 318,
   219/315, 335, 336, 429, 430, 436–439, 441, 442,
   523, 536, 534, 415–419, 279; 126/33

[56] References Cited

U.S. PATENT DOCUMENTS

| | | | |
|---|---|---|---|
| 1,508,982 | 9/1924 | MacDonald | 219/536 |
| 1,689,915 | 10/1928 | Endorf | 219/437 |
| 1,961,756 | 6/1934 | French | 219/439 X |
| 2,059,995 | 11/1936 | Colbourn | 219/436 |
| 2,314,467 | 3/1943 | Tubbs | 219/439 |
| 3,489,880 | 1/1970 | Bloomfield et al. | 219/436 |

FOREIGN PATENT DOCUMENTS

| | | | |
|---|---|---|---|
| 525574 | 6/1921 | France | 219/438 |
| 964853 | 2/1950 | France | 219/438 |

Primary Examiner—Anthony Bartis
Attorney, Agent, or Firm—Bruns and Wall

[57] ABSTRACT

A apparatus for maintaining precooked food at a desired temperature includes a stationary hollow housing mounted in the bottom part of a warmer for holding a quantity of food. The housing defines a cylindrical passage having an entrance through a wall of the warmer. A removable cylindrical member containing an electric resistance heater is inserted into the passage and is freely rotatable therein. A locking mechanism including a lug secured to a hub at the entrance of the housing and insertable into a circular guideway of a rotor attached to the outer end of the sleeve through a slot in the rotor secures the sleeve within the passage. A counterweight assembly on the sleeve applies a turning moment to the sleeve to automatically rotate the rotor into blocking engagement with the lug when the sleeve is fully inserted into the housing and released, thereby allowing the sleeve to rotate to a predetermined rest position wherein the lug in the guideway is displaced from the slot to lock the sleeve within the passage.

8 Claims, 4 Drawing Figures

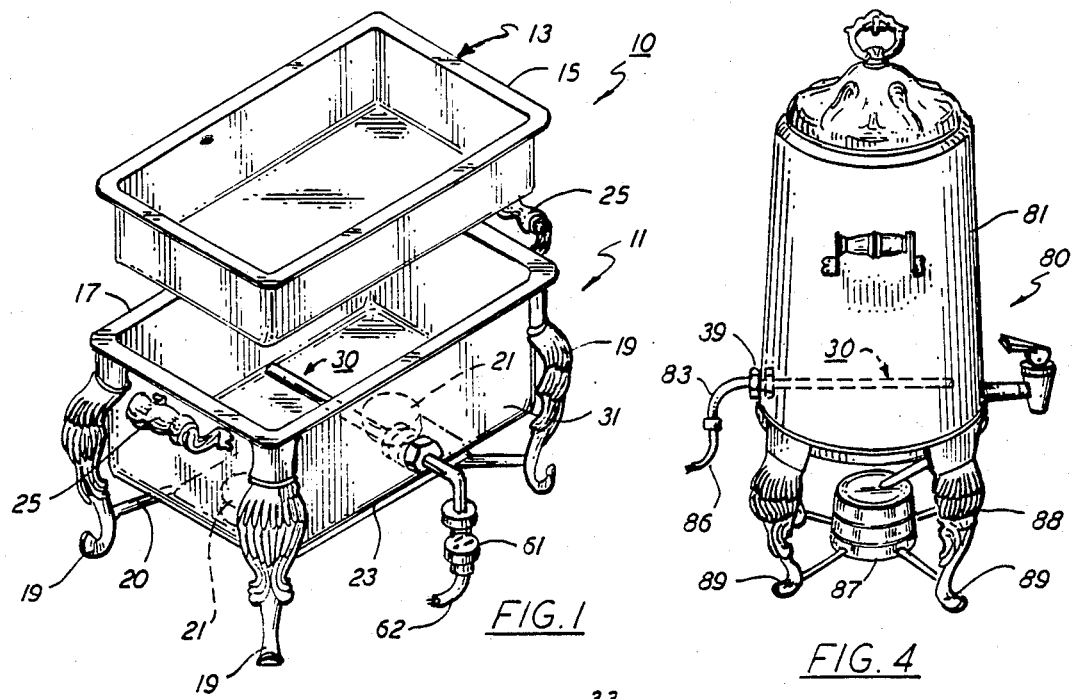
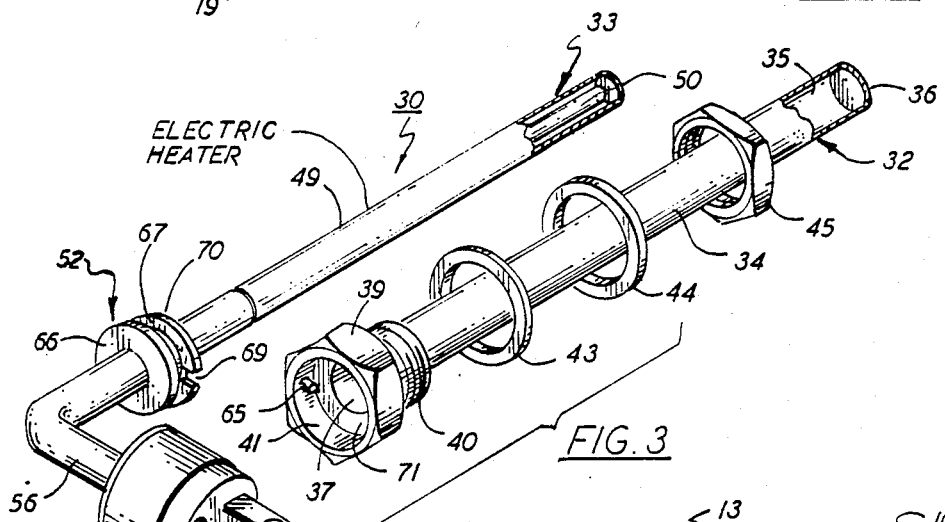
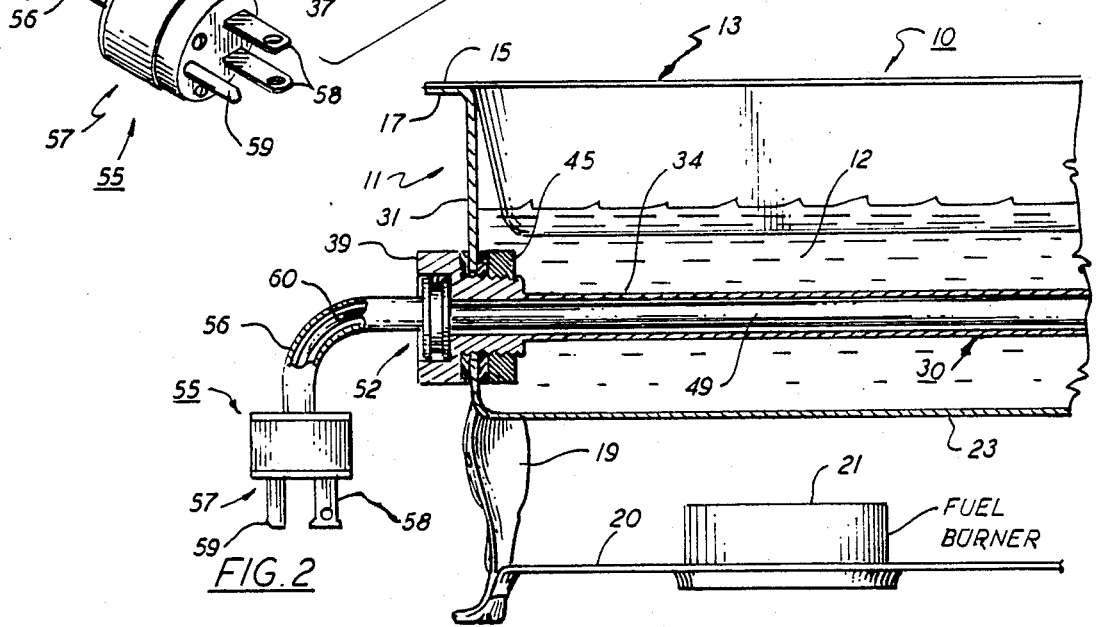

FOOD WARMER WITH REMOVABLE ELECTRIC HEATER

BACKGROUND OF THE INVENTION

This invention relates to a food warmer for maintaining a prepared food at a desired temperature and in particular to a warmer that is equipped with an electrical heater that can be removed from the warmer when not in use.

Some food warmers, such as coffee urns and chafing dishes, are equipped with disposable fuel cells that burn either liquid or solid fuels. One or more disposable cells are generally mounted beneath the warmer and, when lighted, maintain food contained in the warmer at a desired temperature level. The fuel cell or cells permit the warmer to be self-contained so that it can be used almost anywhere. The disposable cells, however, can be extinguished or the fuel may become exhausted without being noticed thus permitting the food to cool to a point where it is no longer palatable. Some fuel cells utilize relatively low grade fuels that give off objectionable smoke and fumes. The smoke usually condenses on cooler surfaces and leaves behind a dirty film or residue.

Electrically equipped servers may therefore be preferred for indoor use where an electrical source of power is readily available. For the most part, these electrical warmers contain heating elements that form an integral part of the warmer body. The heating element generally cannot be immersed in water making the warmer difficult to clean. The connector used to couple the element is, for the most part, bulky and unattractive, thus detracting from the aesthetic value of the serving dish. Lastly, because the heating element forms a part of the warmer, it cannot be easily replaced when it becomes damaged or worn out. Accordingly, the warmer is usually discarded when the heater is no longer serviceable. This can be a costly practice when the warmer is relatively expensive.

SUMMARY OF THE INVENTION

It is therefore an object of the present invention to improve food warmers such as coffee urns and chafing dishes.

A further object of the present invention is to provide a completely detachable electrical heating element for use in conjunction with a food warming unit that is easy to install and remove and which does not detract from the aesthetic value of the unit.

A still further object of the present invention is to provide an electrical heating unit for use in conjunction with a food warmer which can be easily replaced in the event the unit is damaged or broken.

Another object of the present invention is to provide a food warmer wherein either a disposable fuel cell or a removable electrical heater can be selectively employed to maintain food contained in the warmer at a desired temperature.

Yet another object of the present invention is to provide a removable heating unit for use in association with a food warmer that can be simply locked in place or removed from the warmer so that it can be easily cleaned and store when not in use.

These and other objects of the present invention are attained by a food warmer that includes a fluid tight tubular housing contained therein which opens to the outside through a side wall so that a cylindrical sleeve containing a heater can be inserted into the housing. A counterweight is attached to the sleeve which automatically rotates the unit within the housing into a locked position. A locking mechanism is arranged to automatically secure the sleeve within the housing when it is rotated into the locked position and to free the sleeve when it is rotated to a second release position. The warmer may be further equipped with one or more disposable fuel cells that will allow it to be utilized when a source of electrical energy is not readily available.

BRIEF DESCRIPTION OF THE DRAWINGS

For a better understanding of these and other objects of the present invention, reference is had to the following description of the invention which is to be read in conjunction with the accompanying drawings, wherein:

FIG. 1 is a perspective view of a chafing dish for warming food that embodies the teachings of the present invention;

FIG. 2 is an enlarged partial side elevation of the chafing dish illustrated in FIG. 1 with portions broken away to show the removable electrical heating unit mounted in the bottom of the dish;

FIG. 3 is an exploded view of a removable heating unit suitable for use in a food warmer; and FIG. 4 is a perspective view of a coffee urn utilizing the teachings of the present invention.

DESCRIPTION OF THE INVENTION

Turning now to the drawings, wherein like elements are identified by like numbers, there is shown a chafing dish 10 in FIGS. 1 and 2 that is used to keep precooked food or foods warm as for example during the serving of a buffet meal or the like. The term warmer shall be used herein in relation to either chafing dishes, coffee urns or other types of food servers that can be used to keep food at a desired temperature. The serving dish 10 includes a relatively deep, liquid-tight container 11 capable of holding a quantity of water 12. A shallower serving tray 13 for holding food is received in the container and is provided with a horizontally extended flange 15 that seats against the upper rim 17 of the container. In assembly, the bottom section of the tray is immersed in the water bath supported within the container. The warmer is equipped with four ornate but functional legs 19—19 which support the container at an elevated position over the support surface. Although not shown, the warmer further includes a cover that is fitted over the serving tray for protecting the food and containing heat within the unit.

A horizontally disposed bracket 20 is suspended between the legs 19—19 beneath the container. The bracket is adapted to support a pair of disposable fuel cells 21—21 underneath the bottom wall 23 of the container. The fuel cells can be any one of many such commercially available burners that are arranged to burn either liquid or solid fuels to heat the water bath to a suitable level whereby food stored in the tray is kept at a desired temperature. The warmer is equipped with a pair of heat resistant handles 25—25 so that the warmer can be easily and safely transported after it has been heated.

As noted above, the fuel cells are ideally suited for heating food stored in the warmer particularly where other forms of energy are not available. The usefulness of the present warmer, however, is greatly expanded by equipping it with an electrical heating unit generally referenced 30 in FIGS. 1-3. The heating unit is adapted to pass into the container 11 through the back wall 31 thereof. The unit includes a stationary member 32 and a removable member 33 (FIG. 3).

As best illustrated in FIG. 3, the stationary member 32 includes a hollow tubular housing 34 having a cylindrical passage 35 that is closed at one end by a wall 36. The opposite end of the housing contains a circular entrance 37 that is surrounded by a mounting hub 39. The hub, in turn, is connected to a raised threaded shank 40 that forms an integral part of the housing. As best seen in FIG. 2, the stationary member is passed into the container through a hole 41 (FIG. 2) provided in back wall 31. The diameter of the hole is slightly greater than the outside diameter of the threaded shank 40 so that the shank and housing can pass through the wall to position the housing adjacent to, and in close proximity with, the bottom wall 23 of the container. In assembly, a pair of rubber washers 43 and 44 are placed over the threaded shank on either side of the back wall and a lock nut 45 is threaded onto the shank. The nut is tightened against the washer 44 to draw the hub tightly against the opposing washer 43 thereby locking the stationary member to the container. At closure, the washers provide a liquid-tight seal that prevents water in the container from escaping.

The stationary member can be easily installed within an existing warmer that is equipped to use disposable fuel cells as a source of heat. As should be evident, the warmer can be retrofitted by simply forming a small hole in the back of the container. Although a threaded connector is herein used to secure the housing to the container, the invention is not limited to this specific type of connection and any suitable joining technique such as silver soldering or the like capable of forming a liquid tight joint may be employed. The housing, as shown in FIG. 2, is suspended over the bottom wall 23 so that it may be completely blanketed by the water bath.

The removable member 33 includes a cylindrical elongated sleeve 49 which protectively encloses an electrical heater 50. The heater can be any one of many commercially available devices that can be thermostatically controlled to produce a desired BTU output. The sleeve is slidably received within the passage 35 of housing 34 to provide a close running fit between the adjacent surfaces of the two members. Accordingly, the sleeve of the removable member is free to rotat inside the housing about the axis of the passage contained therein. A rotor assembly 52 is secured to the sleeve and is arranged to be received within an annular chamber 41 contained within the hub 39. A counterweight assembly 55 is suspended from the sleeve on the outer side of the rotor. The assembly consists of a offset or moment arm 56 that supports an electrical plug connector 57 some distance away from the central axis of the sleeve 49. The connector includes a pair of electrical terminals 58 and a ground lead terminal 59. An electrical lead 60 passes into the sleeve through the arm and serves to connect the heater 50 to the plug. The heater, as is typical, is equipped with a thermostat (not shown) for controlling the operation thereof. The plug, in practice, is mated with the socket 61 of an extension cord 62 (FIG. 1) so that the heater can be connected to any suitable electrical outlet.

When the sleeve is slidably contained within the housing of the stationary member, the counterweight assembly automatically rotates the assembly into a vertical position as shown in FIG. 2 wherein the moment arm hangs down in a 6 o'clock position below the housing. This position is herein referred to as the locked position.

The rotor assembly 52 is arranged to mate with a radially extended lug 65 that depends from the inner wall of the hub chamber 41 when the sleeve 49 is fully inserted within the housing. The rotor contains an annular body 66 that has a circular guideway 67 formed therein in which the lug freely rides. An axially extended entrance slot 69 is cut into the back of the rotor body to permit the lug to enter the guideway as the sleeve is being inserted into the housing. When the lug is fully retained within the guideway, the inside end face 70 of the rotor rests against the back wall 71 of the hub chamber 41.

In assembly, the lug is mounted in the upper part of the hub chamber preferably approaching a 12 o'clock position. The entrance slot of the rotor, on the other hand, is contained on the bottom side of the rotor so that the slot and the moment arm lie in a common plane. To insert the rotor in the hub chamber, the counterweight assembly must be turned to a release position wherein the lug is aligned with the entrance slot. Once the lug has passed axially into the guideway, the counterweight assembly is released whereupon it will rotate automatically under the influence of the rotational moment into the previously noted locked position thus securing the removable member within the stationary member. To remove the heater from the warmer, the noted procedure is simply reversed.

Although the present invention is ideally well suited for use in association with a chafing dish, it is equally well suited for use in conjunction with a coffee urn such as the urn 80 shown in FIG. 4. Here again, the electrical apparatus 30 includes a stationary member 32 that is joined to the side wall 81 of the urn. The removable member 33 containing a heater is slidably received in the housing of the stationary member and is locked in place using the previously described lug and rotor assembly housed within hub 39. In this particular embodiment of the invention, the electrical plug connector is removed from the moment arm 83 of the counterweight assembly and is placed on the end of an extension cord 86. The cord passes through the offset arm and the heater sleeve and is wired directly to the heater and the heater thermostat. Here again, the offset moment arm places a high enough rotational force upon the sleeve to pull the arm down into a vertical or locked position.

A single fuel cell 87 is mounted on a bracket 88 suspended between the legs 89—89 of the urn to provide a second source of heat when needed.

While this invention has been described in detail above with respect to a preferred embodiment, it should be recognized that the invention is not limited to that embodiment, and that many modifications and variations thereof would present themselves to those of skill in the art without departure from the scope and spirit of this invention, as defined in the appended claims.

I claim:

1. Apparatus for maintaining precooked food at a desired temperature that includes a warmer for holding a quantity of food,
   a stationary hollow housing member having a cylindrical passage, said housing member being mounted in the bottom part of the warmer and said housing member passing out of the warmer through at least one wall thereof so that said passage has an entrance located on the outside of said at least one wall, a removable member having a cylindrical sleeve that is insertable within the cylindrical passage of said stationary housing through said entrance member, said sleeve being able to rotate freely within said passage when inserted therein, an electrical heating means contained inside the sleeve for providing heat to the warmer, a moment inducing counterweight means attached to the sleeve for applying a turning moment to the sleeve for automatically rotating the sleeve to a predetermined rest position when the sleeve is released after it is inserted into said passage with the counterweight means in an unbalanced position, a locking means acting between the stationary housing member and the removable member including a lug secured to one of said members and a rotor secured to the other of said members, said rotor having a circular guideway for rotatably retaining said lug to lock the removable member within the stationary housing member when the sleeve is automatically rotated into said predetermined rest position by operation of said moment inducing means whereby the removable member is prevented from being removed from the stationary housing member, and said rotor further containing an axial slot that opens into the guideway which permits the lug to pass laterally into and out of the guideway when the sleeve is rotated to a position that is angularly displaced in regard to said predetermined rest position thereby allowing the removable member to be removed from said stationary housing member.

2. The apparatus of claim 1 wherein said lug is secured within a hub surrounding the entrance to said stationary housing member, and the rotor is secured to the sleeve of the removable member and is seated within said hub when the sleeve is fully inserted in the housing.

3. The apparatus of claim 1 wherein said moment inducing counterweight means includes an offset moment arm joined to the sleeve having an electrical lead passing through the moment arm into said sleeve for connecting the heater to a source of electrical power.

4. The apparatus of claim 3 wherein said moment inducing counterweight means further includes an electrical connector means mounted on the free end of the moment arm which is connected to the heater by said lead whereby the heater can be connected to an electrical extension cord.

5. The apparatus of claim 3 wherein said lead is an elongated extension cord having a plug means at the end thereof whereby the heater can be connected detachably to an electrical outlet.

6. The apparatus of claim 1 that further includes a bracket means supported beneath the warmer for holding at least one fuel cell.

7. The apparatus of claim 1 wherein said warmer is a coffee urn.

8. The apparatus of claim 1 wherein said warmer is a chafing dish having a container in which the stationary housing member is secured and a serving dish removably supported in the top of the container over the stationary housing member.

* * * * *